(12) United States Patent
Tsai

(10) Patent No.: US 7,746,577 B2
(45) Date of Patent: Jun. 29, 2010

(54) IMAGING SYSTEM

(75) Inventor: Shen-Fu Tsai, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/131,131

(22) Filed: Jun. 2, 2008

(65) Prior Publication Data
US 2009/0195896 A1 Aug. 6, 2009

(30) Foreign Application Priority Data
Jan. 31, 2008 (CN) .......................... 2008 1 0300286

(51) Int. Cl.
*G02B 7/02* (2006.01)
*G02B 27/10* (2006.01)
(52) U.S. Cl. .................... 359/811; 359/819; 359/619
(58) Field of Classification Search ......... 359/290–292, 359/237, 618, 619, 622, 641, 811; 385/33, 385/34, 35, 39, 14, 49, 88, 89, 92, 819–823; 136/246, 253
See application file for complete search history.

(56) References Cited

U.S. PATENT DOCUMENTS

| 4,723,826 | A | * | 2/1988 | Whitaker ................. 126/576 |
| 4,943,125 | A | * | 7/1990 | Laundre' et al. ............. 385/35 |
| 5,280,557 | A | * | 1/1994 | Nwasokwa ................. 385/146 |
| 2002/0141066 | A1 | * | 10/2002 | Nakamura et al. ........... 359/618 |
| 2007/0229936 | A1 | * | 10/2007 | Miles ..................... 359/291 |
| 2008/0117518 | A1 | * | 5/2008 | Wang et al. ............... 359/618 |

\* cited by examiner

*Primary Examiner*—Mohammed Hasan
(74) *Attorney, Agent, or Firm*—Zhigang Ma

(57) ABSTRACT

The present invention provides an imaging system, includes a substrate, an image sensor fixed on the substrate includes a sensing area, a fixing board located on the substrate, at least two micro-lens modules, and at least two optical fibers with input ends respectively positioned in the micro-lens modules and output ends positioned to the fixing board, the output ends of the fibers directing to different portions of the sensing area.

8 Claims, 7 Drawing Sheets

IMAGING SYSTEM

TECHNICAL FIELD

The present invention generally relates to imaging systems and, particularly to a multi-orientation imaging system.

BACKGROUND

FIG. 7 shows a conventional imaging system 100. The imaging system 100 comprises a substrate 12, an image sensor 11 fixed on the substrate 12, and an optical lens module 14. The imaging sensor 11 and the optical lens module 14 are coaxially aligned with each other. An image of an object can be generated on the image sensor 11 and can be shown on a screen (not shown).

In the case above-mentioned, the image sensor 11 in the imaging system 100 corresponds with only one optical lens module 14. Therefore, the imaging system 100 can only orient on and capture an image of one location at a time.

What is needed, therefore, is an imaging system which can capture images from multi-orientation at a time.

SUMMARY

An imaging system includes a substrate, an image sensor fixed on the substrate, a fixing board located on the substrate, at least two micro-lens modules, and at least two optical fibers with input ends respectively positioned at the micro-lens modules and output ends positioned to the fixing board. The image sensor includes a central sensing area. The output ends of the fibers directed toward different portions of the sensing area.

The imaging system in this invention, uses several micro-lens modules and several optical fibers guiding the light from the micro-lenses modules to the image sensor, then displays the image inducted by the image sensor. The imaging system can get images from different position or angle without the rotating head. Therefore, the imaging system can get images from a wider spatial range around the imaging system.

Other advantages and novel features of the present invention will become more apparent from the following detailed description of embodiments when taken in conjunction with the accompanying drawings.

DETAILED DESCRIPTION OF THE EMBODIMENTS

Figure 1:
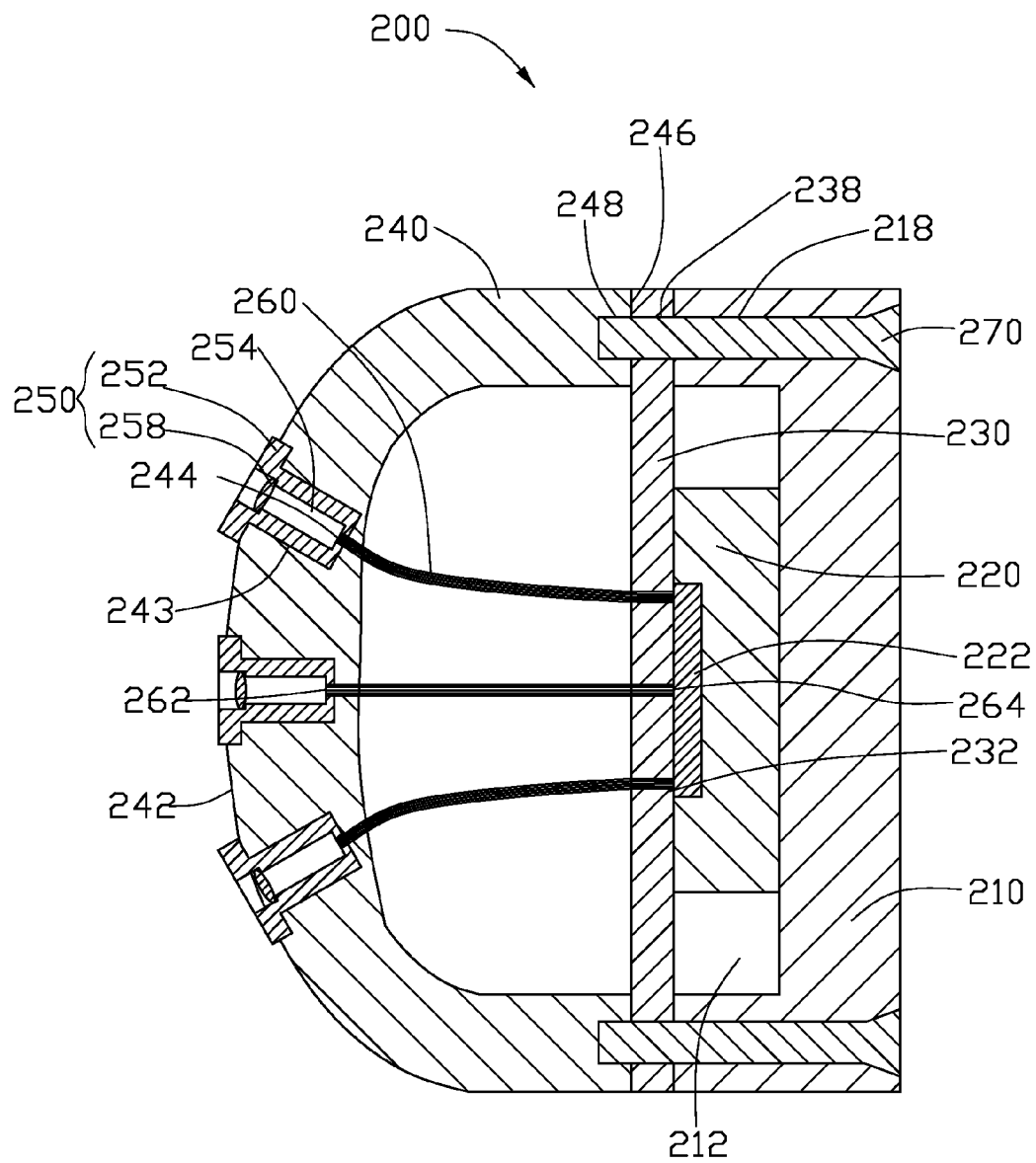
FIG. 1 is a cross-sectional view of an imaging system according to a first exemplary embodiment.

Referring to FIG. 1, an imaging system 200 in accordance with a first exemplary embodiment includes a substrate 210, an image sensor 220 accommodated in the substrate 210, a fixing board 230 mounted on the substrate 210 and covering the imaging sensor 220 in the substrate 210, a shell 240, a plurality (seven are used in the embodiment as an example) of micro-lens modules 250 positioned in the shell 240, and a plurality of optical fibers 260 for transmitting light from the corresponding micro-lens module 250 to an area of the imaging sensor 220. The imaging system 200 further includes several rivets 270 for assembling the substrate 210, the fixing board 230 and the shell 240 together. Alternatively in other embodiments, the substrate 210, the fixing board 230 and the shell 240 can be assembled together by adhesive, or other suitable means.

The substrate 210 can be made of fiberglass, reinforced plastic or ceramic material. The substrate 210 includes a central recessed portion 212 at a side thereof for accommodating the image sensor 220 therein, and defines four through holes 218 surrounding the recessed portion 212, for extension of the rivets 270 therethrough. FIG. 1 only shows two of the through holes 218 because it is a cross-sectional view of the imaging system 100.

The image sensor 220 is electrically connected with the substrate 210, in the recessed portion 212. The height of the image sensor 220 is less than or equal to a depth of the recessed portion 212 of the substrate 210. The imaging sensor 220 includes a central sensing area 222.

Figure 2:
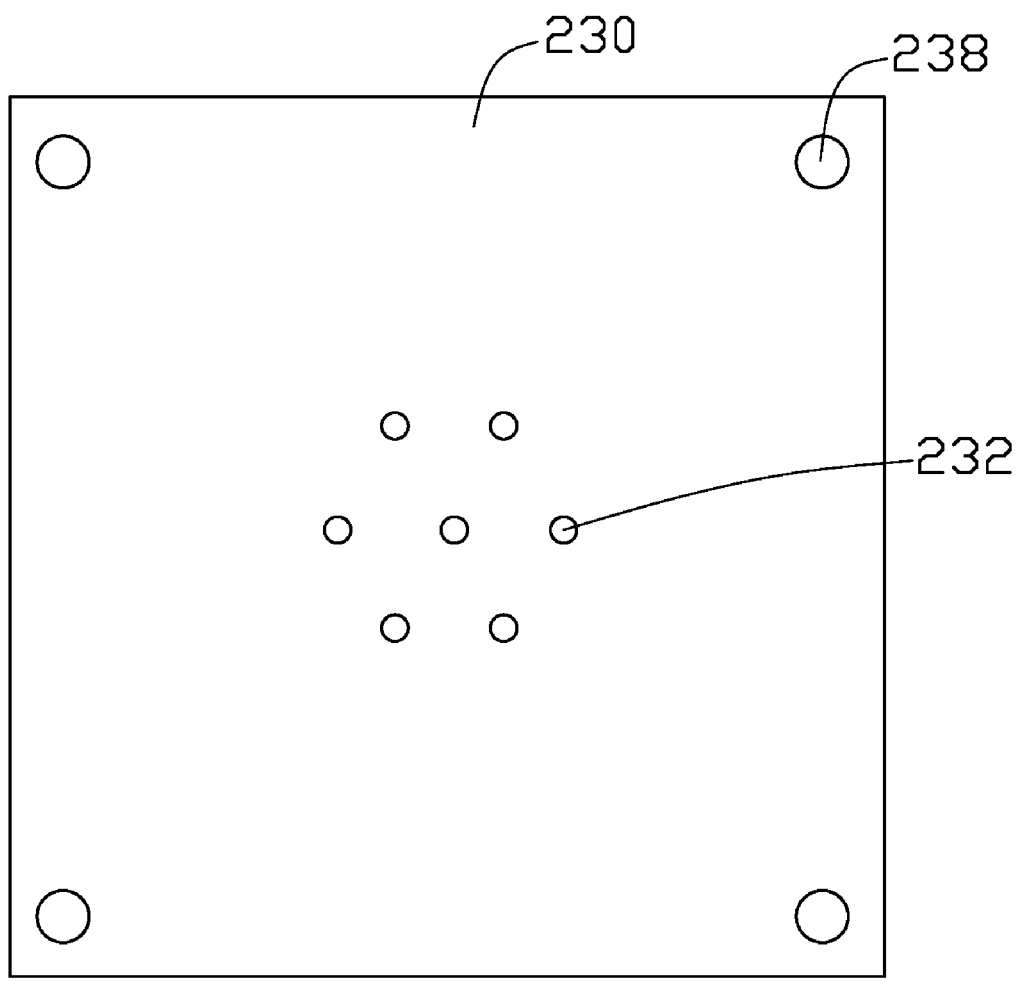
FIG. 2 is a plan view of a fixing board in FIG. 1.

The fixing board 230 covers the substrate 210, and encloses the recessed portion 212 of the substrate 210. Referring to FIG. 2, the fixing board 230 has a rectangular configuration, and defines seven perforations 232 at central portions thereof, and four through holes 238 at diagonal corners thereof. The perforations 232 are directed to the sensing area 222 of the imaging sensor 220. The through holes 238 are respectively aligned with the through holes 218 in the substrate 210 for extension of the rivets 270 therethrough, and surround the perforations 232.

Referring back to FIG. 1, the shell 240 is domed, and has a main body 242 covering the fixing board 230 and a brim 246 fixed to the fixing board 230. The main body 242 is separated from the fixing board 230, and defines seven separate cavities 243 therein. The brim 246 defines four holes 248 corresponding to the through holes 238 of the fixing board 230, for extension of the rivets 270 therethrough. FIG. 1 only shows three of the cavities 243 and two of the holes 248 because it is a cross-sectional view of the imaging system 100. Each cavity 243 communicates with an orifice 244 defined on the bottom thereof.

The micro-lens modules 250 are positioned in the cavities 243 respectively. Each micro-lens module 250 includes a lens barrel 252 and at least one optical lens 258 held in the barrel 252. Each of the lens barrels 252 defines a passage 254 for allowing light to be transmitted to the corresponding lens 258 and further the corresponding optical fiber 260.

The optical fibers 260 each includes an input end 262 positioned in the corresponding passage 254, and an output end 264 positioned in the corresponding perforation 232, so that the light from the lens 258 can be transmitted to the image sensor 220 via the optical fibers 260. The focal points of the optical lens 258 are located at the input end 262 of the corresponding optical fiber 263, such as at an extremity of the input end 262.

Figure 3:
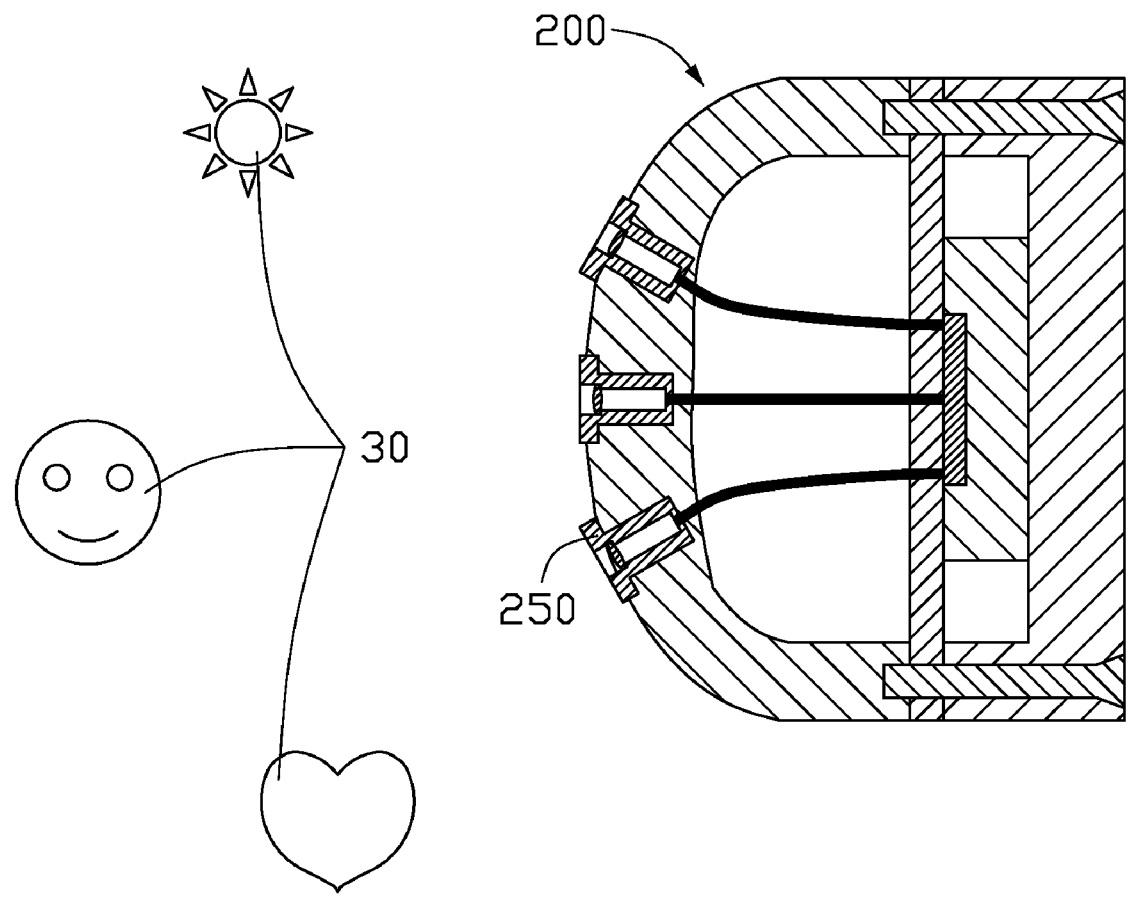
FIG. 3 is similar to FIG. 1, but including three objects for image capture.
Figure 4:
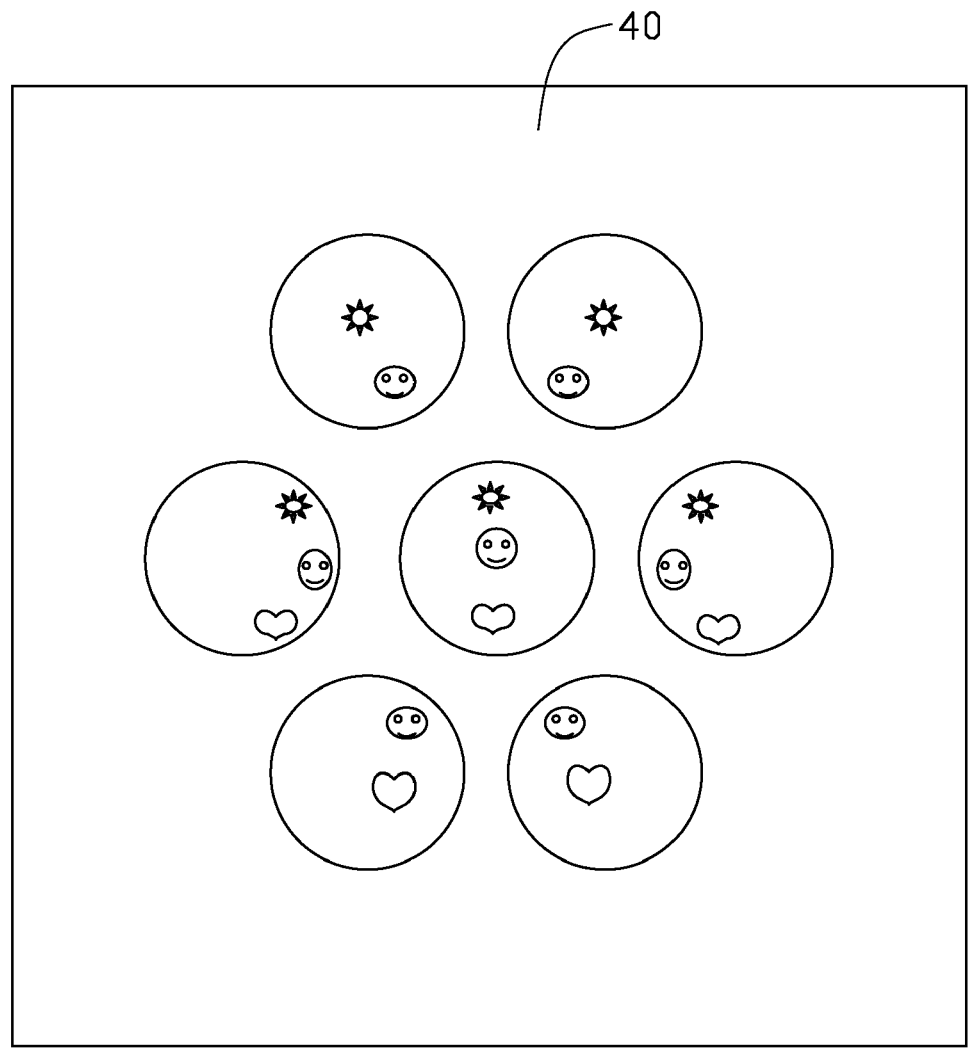
FIG. 4 is a plan view of a screen displaying images formed by the imaging system of FIG. 1.

In operation of the imaging system 200, the micro-lens modules 250 can orient toward different locations, because they are separately positioned in the domed shell 240. Light from the different micro-lens modules 250 can be transmitted to different portions of the sensing area 222 of the image sensor 220 via the optical fibers 260. Finally, referring to FIGS. 3-4, images of different scenes can be formed on a same screen 40. For example, images of three different objects 30 are captured by different micro-lens modules 250 and formed on the screen 40.

Figure 5:
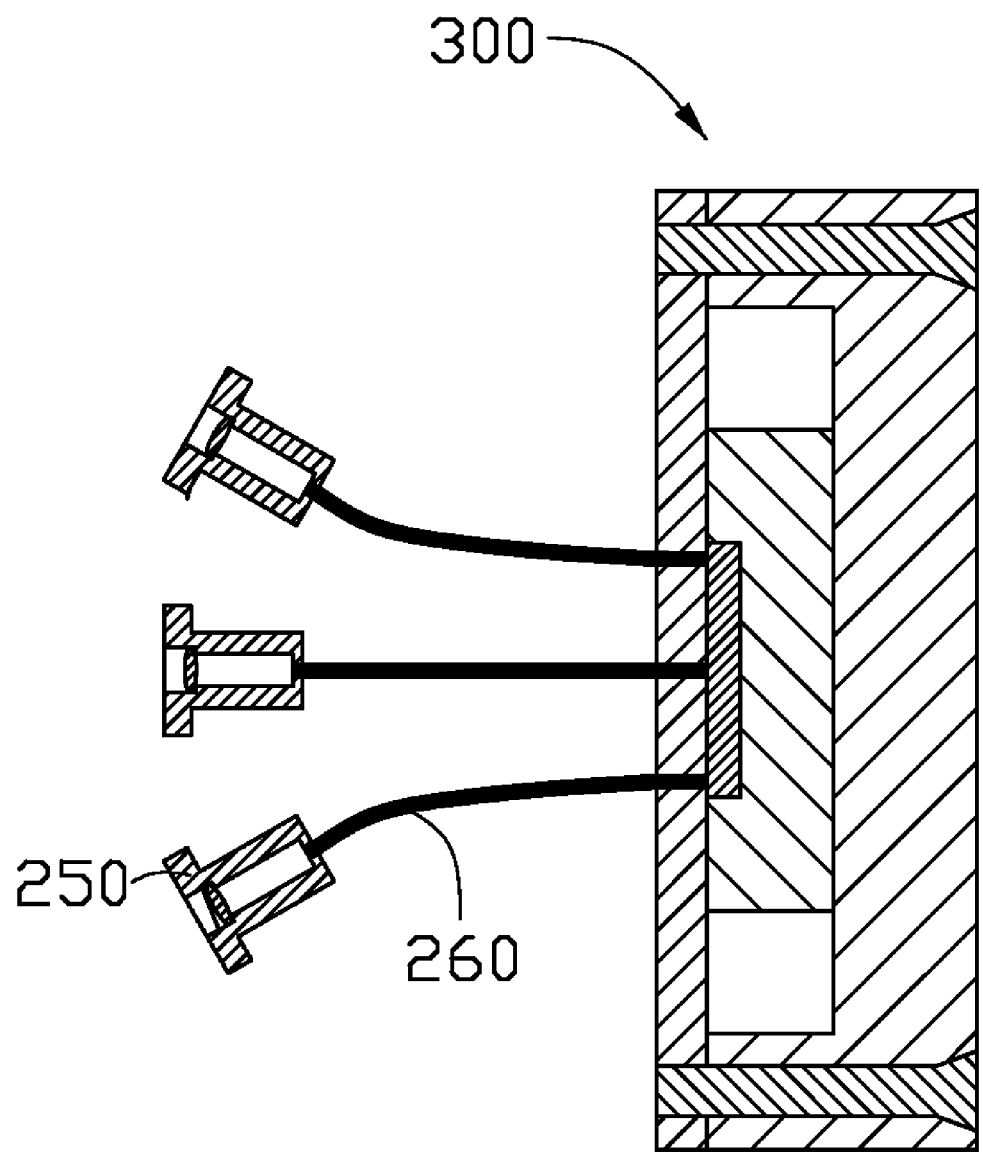
FIG. 5 is a cross-sectional view of an imaging system according to a second embodiment.
Figure 6:
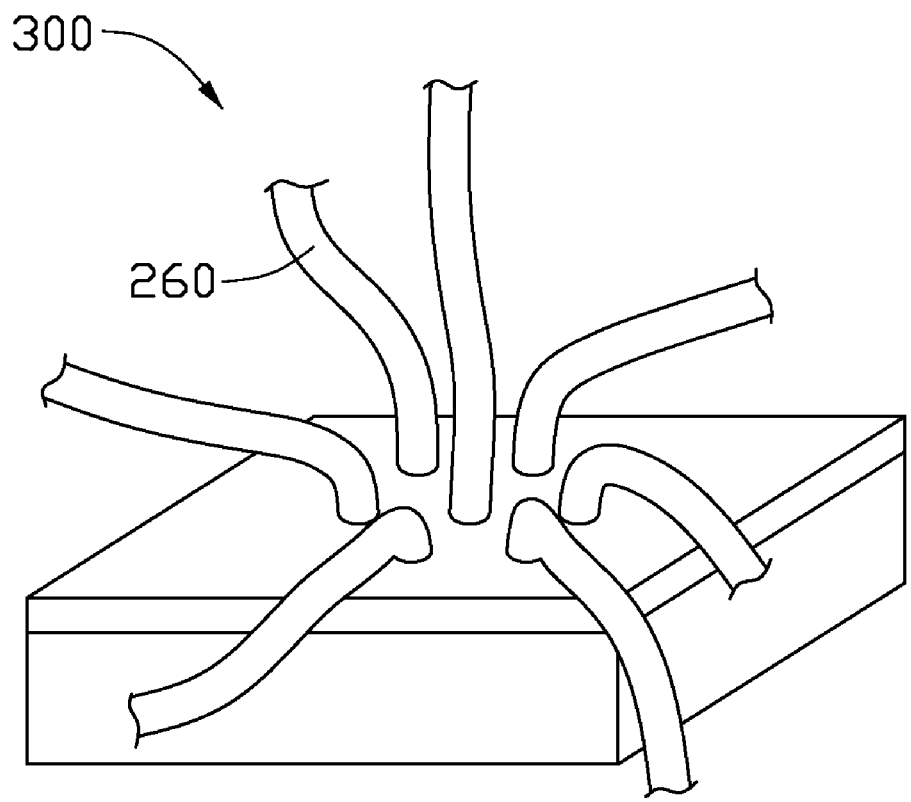
FIG. 6 is a isometric view of the imaging system of FIG. 5.
Figure 7:
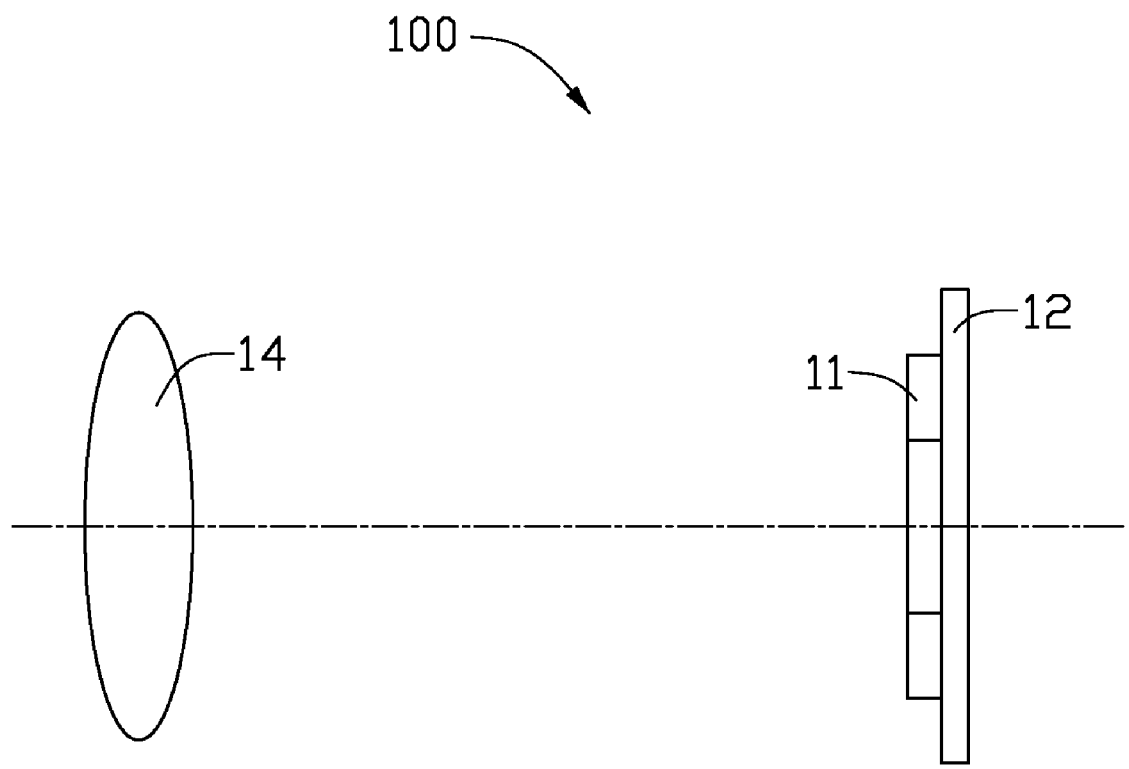
FIG. 7 is a conventional imaging system

FIGS. 5 and 6 show an imaging system 300 in accordance with a second exemplary embodiment. The imaging system 300 is similar to the imaging system 200 of the first embodiment as shown in FIG. 1. The difference is that the imaging system 300 omits the shell 240 of the imaging system 200, and lengthens the optical fibers 260 of the imaging system 200 so that the lens modules 250 can be positioned more freely for capturing images from completely different direction.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An imaging system comprising:
a substrate;
an image sensor fixed on the substrate including a sensing area;
a fixing board located on the substrate;
at least two micro-lens modules each comprising a lens barrel and at least one optical lens held in the lens barrel, the lens barrel defining a passage for allowing light to be transmitted; and
at least two optical fibers with input ends respectively positioned at the at least two micro-lens modules and output ends positioned to the fixing board, the output ends of the at least two optical fibers directed toward different portions of the sensing area.

2. The imaging system as claimed in claim 1, wherein the substrate includes a central recessed portion at a side thereof for accommodating the image sensor therein, and defines a plurality of through holes surrounding the recessed portion.

3. The imaging system as claimed in claim 2, wherein the fixing board defines a plurality of perforations directed to the sensing area of the image sensor, and a plurality of through holes are respectively aligned with the through holes in the substrate.

4. The imaging system as claimed in claim 3, wherein the input end of each of the at least two optical fibers is positioned in the corresponding passage, and the output end in the corresponding perforation.

5. The imaging system as claimed in claim 4, wherein the imaging system further includes a screen used for displaying the images inducted by the image sensor.

6. The imaging system as claimed in claim 3, wherein the imaging system further comprises a shell assembled together with the fixing board and the substrate; and wherein the shell comprises a main body covering the fixing board and a brim fixed to the fixing board, the main body is separated from the fixing board, and defines at least two cavities therein.

7. The imaging system as claimed in claim 6, wherein the brim defines a plurality of holes corresponding to the through holes of the fixing board and the substrate.

8. The imaging system as claimed in claim 7, wherein the substrate, the fixing board and the shell are assembled together via a plurality rivets according to the holes of the substrate, the fixing board and the shell.

* * * * *